US012377664B2

(12) United States Patent
Beier et al.

(10) Patent No.: US 12,377,664 B2
(45) Date of Patent: Aug. 5, 2025

(54) LIGHT TRAP FOR UV RADIATION FOR CURING INK ON A PRINTING SUBSTRATE AND PRINTING MACHINE INCLUDING A LIGHT TRAP

(71) Applicant: Heidelberger Druckmaschinen AG, Heidelberg (DE)

(72) Inventors: Bernard Beier, Ladenburg (DE); Silas Falter, Heddesbach (DE); Andreas Müller, Heidelberg (DE); Klaus-Dieter Scharf, Königsfeld (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 107 days.

(21) Appl. No.: 18/493,851

(22) Filed: Oct. 25, 2023

(65) Prior Publication Data

US 2024/0198694 A1 Jun. 20, 2024

(30) Foreign Application Priority Data

Dec. 14, 2022 (DE) ..................... 10 2022 133 202.0

(51) Int. Cl.
*B41J 11/00* (2006.01)

(52) U.S. Cl.
CPC ................................ *B41J 11/00218* (2021.01)

(58) Field of Classification Search
CPC ........................ B41J 11/00218; B41J 11/00214
See application file for complete search history.

(56) References Cited

U.S. PATENT DOCUMENTS

| | | | |
|---|---|---|---|
| 6,783,227 B2 | 8/2004 | Suzuki et al. | |
| 7,137,695 B2 | 11/2006 | Yokoyama | |
| 7,370,955 B2 | 5/2008 | Yokoyama et al. | |
| 7,997,716 B2 | 8/2011 | Yokota | |
| 11,548,296 B2 | 1/2023 | Greive et al. | |
| 2005/0012778 A1* | 1/2005 | Nishino ............. | B41J 11/00214 347/29 |
| 2007/0077367 A1 | 4/2007 | Miura | |
| 2022/0324242 A1 | 10/2022 | Takehana | |

FOREIGN PATENT DOCUMENTS

| | | |
|---|---|---|
| DE | 60305366 T2 | 3/2007 |
| DE | 102018210836 A1 | 2/2019 |
| DE | 102019209327 A1 | 2/2020 |

(Continued)

*Primary Examiner* — Bradley W Thies
(74) *Attorney, Agent, or Firm* — Laurence A. Greenberg; Werner H. Stemer; Ralph E. Locher

(57) ABSTRACT

A light trap for ultraviolet radiation for curing ink on a printing substrate contains a shaped body with more than two shape elements succeeding one another. The shaped body has a side facing the printing substrate and embodied to have step elements in a stepped arrangement as shape elements. Every step element contains a pair formed of a step surface and a riser, the step surfaces and the risers having different inclinations relative to the direction of transport. The step surfaces have a step length L and the riser has a step height H, and is characterized in that the following applies: L>2H. This provides an improved UV screen by use of the light trap while simultaneously simplifying the process of cleaning the light trap. This is preferably used in the process of printing and curing UV inks.

9 Claims, 2 Drawing Sheets

(56) References Cited

FOREIGN PATENT DOCUMENTS

| | | | |
|---|---|---|---|
| EP | 1498274 | A1 | 1/2005 |
| EP | 1974936 | B1 | 2/2010 |
| EP | 1579995 | B1 | 2/2012 |
| EP | 3718777 | A1 | 10/2020 |
| JP | 2005125792 | A | 5/2005 |
| JP | 2012116097 | A | 6/2012 |
| JP | 2014184666 | A | 10/2014 |
| JP | 2020001296 | A | 1/2020 |
| WO | 2020045775 | A1 | 3/2020 |

* cited by examiner

LIGHT TRAP FOR UV RADIATION FOR CURING INK ON A PRINTING SUBSTRATE AND PRINTING MACHINE INCLUDING A LIGHT TRAP

CROSS-REFERENCE TO RELATED APPLICATION

This application claims the priority, under 35 U.S.C. § 119, of German Patent Application DE 10 2022 133 202.0, filed Dec. 14, 2022; the prior application is herewith incorporated by reference in its entirety.

FIELD AND BACKGROUND OF THE INVENTION

The invention relates to a light trap for UV radiation when ink is cured on a printing substrate and to a printing machine with the light trap.

The technical field of the invention is the field of the graphic industry, in particular the field of the printing and UV-curing of printing fluids such as (liquid) ink, varnish and/or primer on printing substrates in the form of sheets, webs, foil, or labels, preferably made of paper, cardboard, paperboard, synthetic materials, metals, or composites.

In the field of printing UV inks onto printing substrates, preferably in what is known as an inkjet printing process, it has become known to cure the ink on the printing substrate using UV radiation. In this process, care needs to be taken to prevent reflected or scattered UV radiation from reaching the ink printing head and causing ink to cure on the sensitive nozzle surface. Various measures involving the use of blinds and light traps have become known.

Published, non-prosecuted German patent application DE 10 2018 210 836 A1 discloses a device for printing on and drying printing substrates. The device contains a light trap for protecting the sensitive inkjet printing heads against radiation from a dryer. A light trap surface facing the printing substrates has a comb-like structure of spaced-apart rectangular shape elements.

Published, non-prosecuted German patent application DE102019209327A1, corresponding to U.S. Pat. No. 11,548,296, discloses a similar device likewise including a comb-like structure of spaced-apart shape elements tapering towards the printing substrate.

European patent EP 1 974 936 B1, corresponding to U.S. Pat. No. 7,997,716, discloses an ink printer for applying UV ink. The printer contains a UV radiation source to which blinds are assigned as light traps. The blinds are embodied as simple surfaces and may be disposed to be perpendicular to the plane of the printing substrate to be irradiated or at an angle different from 90° relative thereto.

Japanese patent application JP 2005 125 792 A, corresponding to U.S. Pat. No. 7,137,695, discloses a similar device which likewise includes a screen surface as a screen against radiation, said screen surface disposed at an angle different from 90° relative to the plane of the printing substrate to be irradiated.

European patent EP 1 579 995 B1, corresponding to 7,370,955, likewise discloses a similar device with perpendicular screen surfaces.

European patent EP 3 718 777 discloses a device for curing UV ink on a printing substrate. The device contains a plurality of emitters and a plurality of optical elements, each emitter assigned an optical element. The optical elements are disposed in a plane between the plane of the emitters and a plane of the printing substrate. The optical elements may be aperture plates. In accordance with one exemplary embodiment, the inner walls of the aperture plates may be provided with what is known as a blazed grating. The blazed grating does not face the printing substrate.

The known light traps and blinds may still have the problem that they do not screen the printing heads from undesired UV radiation to a sufficient extent, thus resulting in printing head failures or requiring additional cleaning steps, both of which reduce productivity and thus incur corresponding costs.

In addition, the known light traps and blinds may have the problem that they are difficult to clean due to their shape, resulting in increased cleaning time and less time available for production, likewise resulting in corresponding costs.

It has become known additionally to provide light traps with an absorbent coating. Yet the problem of insufficient screening may persist. Improved coatings may be expensive and not have a long-enough useful life.

SUMMARY OF THE INVENTION

Therefore, an object of the present invention is to provide an improvement over the prior art, in particular to provide improved UV screening by means of the light trap and to simplify the process of cleaning the light trap.

In accordance with the invention, this object is attained by a device described in the independent light trap claim and by a printing machine described in the independent printing machine claim.

Advantageous and thus preferred further developments of the invention will become apparent from the dependent claims as well as from the description and drawings.

In accordance with the invention, a light trap for UV radiation for curing ink on a printing substrate contains a shaped body with more than two shape elements succeeding one another. The shaped body has a side facing the printing substrate and embodied to have step elements in a stepped arrangement as shape elements. Every step element contains a pair consisting of a step surface and a riser, the step surfaces and the risers having different inclinations relative to the direction of transport, and the step surfaces having a step length L and the riser having a step height H, and is characterized in that the following applies: $L>2H$.

A printing machine for printing on a printing substrate using a UV-curable fluid contains a printing head for transferring drops of fluid to the printing substrate and a UV emitter for curing the fluid on the printing substrate using UV light, and at least one light trap for UV light disposed between the printing head and the UV emitter on one side of the printing substrate and/or at least one light trap for UV light disposed on the other side of the printing substrate, and is characterized in that the light trap is designed in accordance with the invention.

We now describe advantageous embodiments and effects of the invention.

The invention advantageously provides a way of further improving UV screening by means of the light trap while simultaneously simplifying the process of cleaning the light trap.

In accordance with the invention, the shape of the body evidently differs from the known comb-like shapes. It was found and further optimized in the course of tests with the aid of computer simulation. Surprisingly, the flat shape results in a better screening effect to protect against UV radiation and at the same time the shaped surface of the body is easier to clean. Sharp edges, which are present in the comb-like shapes, may be avoided, resulting in much lower risk of injury during manual cleaning. Existing configurations with comb-like shapes, for instance, may easily be retrofitted.

The stepped arrangement of the step elements improves the effect of the light trap as less scattered and/or reflected UV radiation gets to the printing heads and ink may be prevented from curing on the sensitive nozzle surface or in the nozzle openings.

The step elements are preferably of essentially the same shape and may in particular be identical. The step elements are flat, i.e. at least twice as long as they are high and may in particular be three times as long as they are high. This flat shape is particularly advantageous in terms of the screening effect and at the same time in terms of ease of cleaning. The step elements are preferably inclined in or against a direction of transport of the printing substrates and/or relative to a plane opposing the printing substrate, in particular only slightly inclined, i.e. by less than 10° (or 180°-10°). The transitions between the step elements are preferably rounded.

Further Developments of the Invention:

The following paragraphs describe preferred further developments of the invention (in short: further developments).

A further development may be characterized in that the shaped body is disposed opposite and preferably at a distance to a printing substrate transported along the light trap in a direction of transport. The distance may be selected to be greater than it is in accordance with the prior art using comb-like structures.

A further development may be characterized in that the shaped body is disposed to be stationary.

A further development may be characterized in that an angle between step surface and (upstream or downstream) riser is preferably selected in a range of approximately 90°.

A further development may be characterized in that the step elements succeed one another in or against the direction of transport. A further development may be characterized in that the step elements directly succeed one another. A further development may be characterized in that the step surfaces and risers succeed one another in or against the direction of transport. A further development may be characterized in that the step surfaces and risers directly succeed one another. A further development may be characterized in that the step surfaces and risers succeed one another in an alternating way; for instance, long step surfaces and short risers may alternate.

A further development may be characterized in that a) the step surfaces are inclined in the direction of transport and the risers are inclined against the direction of transport or b) the step surfaces are inclined against the direction of transport and the risers are inclined in the direction of transport. The inclined step surface is preferably closer to the horizontal and the inclined riser is preferably closer to the vertical. For instance, the step surfaces may face the emitter and the risers may face away from the emitter.

A further development may be characterized in that the step surfaces are inclined a) by less than 90° or b) by more than 90° relative to the direction of transport. A further development may be characterized in that the absolute value of the inclination of the step surfaces ranges a) between 4° and 10° or between 5° and 9° or between 6° and 8° or b) between 176° and 170° or between 175° and 171° or between 174° and 172°. A further development may be characterized in that the absolute value of the inclination of the step surfaces is a) 7° or b) 173°.

A further development may be characterized in that the risers are inclined a) by more than 90° or b) by less than 90° relative to the direction of transport. A further development may be characterized in that the absolute value of the risers ranges a) between 99° and 95° or between 98° and 96° or b) between 78° and 88° or between 81° and 85°. A further development may be characterized in that the absolute value of the inclination of the risers is a) 97° or b) 83°.

The aforementioned differentiations between cases a) and b) may be understood as follows: case a) describes a light trap disposed immediately upstream of an emitter in the direction of transport of the printing substrate (i.e. the printing substrate first passes the light trap and then the emitter), whereas case b) describes a light trap disposed immediately downstream of an emitter in the direction of transport of the printing substrate (i.e. the printing substrate first passes the emitter and then the light trap).

A further development may be characterized in that the following applies: $L>3H$, $L>4H$, $L>5H$ or $L>10H$. A step element where $L>2H$ and in particular where $L>3H$ may be referred to as a flat step. Extensive computer simulation in the course of further developing the light trap has surprisingly found that a shape where $L>2H$ and in particular where $L>3H$ significantly improves the effect of the light trap. This means that "flat" steps are more effective and are thus preferred. A further development may be characterized in that the step length is 6.0 mm and 6.3 mm or between 6.05 mm and 6.25 mm or between 6.1 mm and 6.2 mm, or 6.15 mm.

A further development may be characterized in that the transition radius between the step surface and riser ranges between 0.1 mm and 0.4 mm, between 0.2 mm and 0.3 mm, or equals 0.25 mm.

A further development may be characterized in that the step elements are coated with an absorbent coating.

A further development may be characterized in that the shaped body is embodied in such a way that it reduces UV light emitted by an UV ink dryer and reflected/scattered by a printing substrate to which ink has been applied.

A further development of the printing machine may be characterized in that the light trap is disposed at a distance of between 0.4 mm and 0.9 mm to the printing substrate.

A further development of the printing machine may be characterized in that a web of paper, cardboard, plastic foil, or metal foil or a web provided with labels is provided as the printing substrate.

A further development of the printing machine may be characterized in that two light traps are provided, one light trap disposed upstream of the emitter and one light trap disposed downstream of the emitter as viewed in the direction of transport of the printing substrate.

The step elements of two light traps (one upstream and one downstream of an emitter in the direction of transport of the printing substrate) are preferably inclined in different directions.

Any desired combination of the features and combinations of features disclosed in the above sections on the technical field, invention, and further developments as well as in the section below on exemplary embodiments likewise represents advantageous further developments of the invention.

Alternatives:

An alternative to the invention, which is not in accordance with the invention, may be characterized in that the step surfaces and risers are disposed in such a way that their cross-section represents a zigzag line.

This alternative, which is not in accordance with the invention, may be characterized in that the following applies: L=H. The alternative may be characterized in that the angles of the step surfaces and risers relative to a line perpendicular to the printing substrate, e.g. the vertical line, have the same absolute value but different signs.

Other features which are considered as characteristic for the invention are set forth in the appended claims.

Although the invention is illustrated and described herein as embodied in a light trap for UV radiation for curing ink on a printing substrate and printing machine including a light trap, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
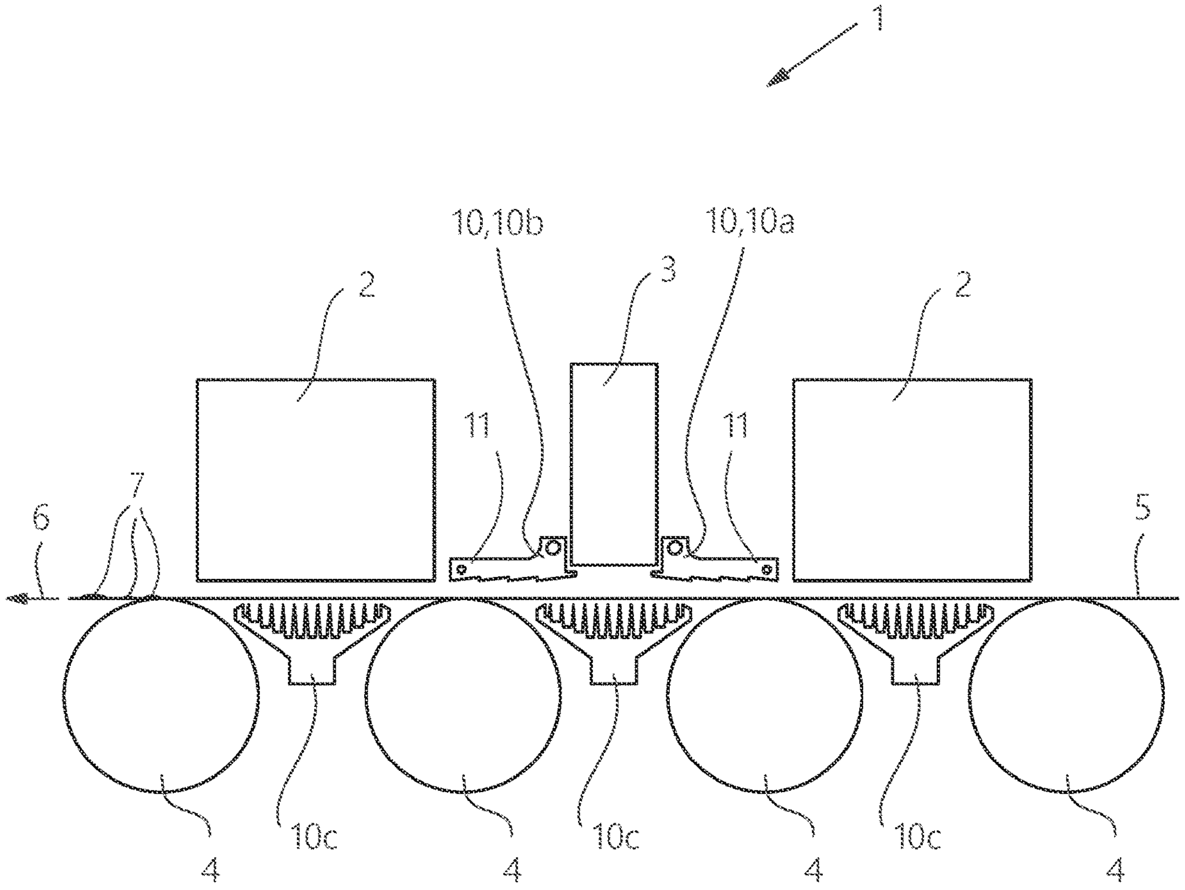
FIG. 1 is an illustration of a preferred exemplary embodiment of a printing machine according to the invention.

In the drawings, corresponding features have the same reference symbols.

Referring now to the figures of the drawings in detail and first, particularly to FIG. 1 thereof, there is shown a preferred exemplary embodiment of a printing machine 1 (only a section of which is shown). The section illustrates an example of two light traps 10 or rather 10*a* and 10*b* in accordance with the invention. The printing machine 1 is an ink printing machine preferably including multiple ink printing heads 2 (e.g. four in the case of CMYK printing), only two of which are shown in the illustrated section. The printing machine 1 preferably contains multiple emitters 3, only one of which is shown in the illustrated section. The emitter 3 is used as an UV ink drier. The printing machine 1 contains multiple transport rollers 4 for transporting a web-shaped printing substrate 5, preferably paper, in a direction of transport 6. The emitter 3 generates UV radiation for curing fluids, in particular ink 7, on the printing substrate 5. The emitter 3 is disposed downstream of a printing head 2 in the direction of transport 6 and may thus in particular be used for what is known as pinning (partial curing) of the ink 7 applied by the printing head 2. At the same time, the emitter 3 is disposed upstream of a further printing head 2 in the direction of transport 6, i.e. the emitter 3 is disposed between two printing heads 2. Each one of the light traps 10 is disposed between the emitter 3 and one of the two printing heads 2 to reduce UV radiation reflected and/or scattered by the printing substrate 5, thus preventing damage to the printing heads 2. The two light traps 10*a* and 10*b* are disposed in a mirror-inverted way relative to one another in terms of the emitter 3, i.e. to a vertical. The printing machine 1 contains further light traps 10/10*c*, which are disposed on the other side of the printing substrate 6 relative to light traps 10*a* and 10*b*. In the illustrated example, the light traps 10*c* are of conventional shape, i.e. they have a comb-like structure. Alternatively, light traps 10*c* may likewise be designed in accordance with the invention.

Figure 2:
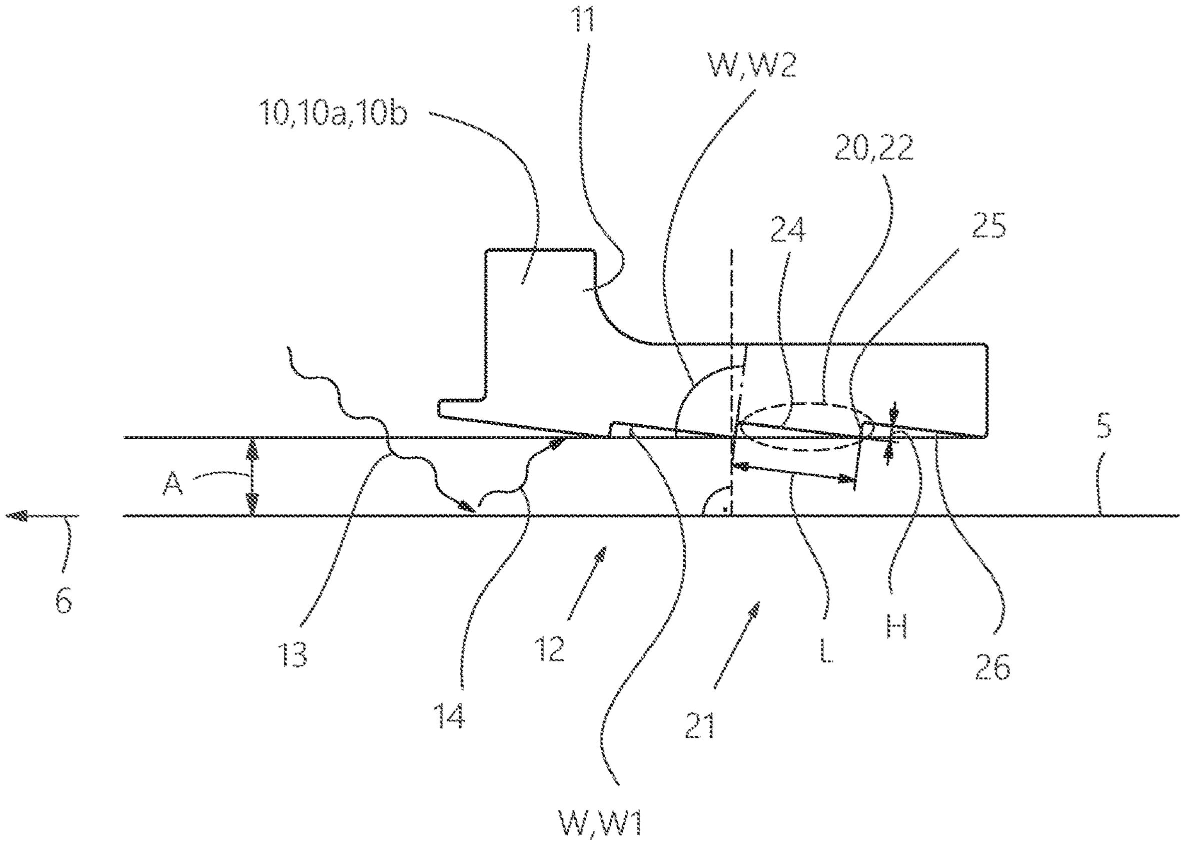
FIG. 2 is a diagrammatic, sectional view of a light trap.

FIG. 2 is a sectional view of a preferred exemplary embodiment of the light trap 10 of the invention. The light trap 10 contains a shaped body 11, for instance made of metal. One side 12 of the shaped body 11 faces the printing substrate 5 at a distance A; in the illustrated example, this is the lower side of the shaped body 11. UV radiation/UV light 13 generated by the emitter 3 may be reflected and/or scattered by the surface of the printing substrate 5 or other surfaces and may thus reach side 12 of the shaped body 11. Side 12 is shaped in accordance with the invention and may thus advantageously reduce the amount of UV light 13 or 14, which might otherwise reach the adjacent printing head 2 and in particular the sensitive nozzle plate thereof.

In accordance with the invention, the shaped body 11 contains multiple step elements 20 as shape elements. The step elements 20 form a stepped or stairs-like arrangement 21. The step elements 20 are disposed to immediately succeed one another in the direction of transport 6; in the illustrated example, they merge into one another. The illustrated example contains four step elements 20. FIG. 2 schematically illustrates an alternative to this stepped arrangement 21 including a zigzag line/arrangement of this kind. Every step element 20 contains a pair 23 consisting of a step surface 24 with a step length L and a riser 25 with a step height H. In the illustrated example, the absolute value of the step length is significantly greater than the step height H, for instance more than three times as great; in other words, the steps are flat steps. The transition between step surface 24 and riser 25 is formed by a curved section with a transition radius R. The step elements 20 may additionally be provided with a coating 26 which increases the absorption of UV light 13 or 14.

The step surfaces 24 are inclined by an angle W relative to the plane of the transported printing substrate 5 and/or relative to a plane which is located in the lower side or radiation exit side of the emitter 3. In the illustrated example the step surfaces 24 are inclined in the direction of transport 6. The risers 25 are inclined relative to this plane at a different (second) angle W (the two angles may be referred to as angles W1 and W2). In the illustrated example the risers 25 are inclined against the direction of transport 6. In the illustrated example, the angle between step surface 24 and riser 25 is 90°, angle W is approximately 7°, and the other angle W is approximately 97°.

The following is a summary list of reference numerals and the corresponding structure used in the above description of the invention.

LIST OF REFERENCE NUMERALS

- 1 printing machine
- 2 ink printing head(s)
- 3 emitter/UV ink drier
- 4 transport rollers
- 5 printing substrate
- 6 direction of transport
- 7 ink/fluid
- 10 light trap(s)
- 10*a* first light trap
- 10*b* second light trap
- 10*c* further light traps
- 11 shaped body
- 12 side of the shaped body
- 13 UV radiation/UV light
- 14 reflected and/or scattered radiation

20 step elements (as shape elements)
21 stepped arrangement
22 zigzag line
23 pair
24 step surface
25 riser
26 coating
W angle, e.g. W1 and W2
L step length
H step height
R transition radius
A distance to the printing substrate

The invention claimed is:

1. A light trap for ultraviolet (UV) radiation for curing ink on a printing substrate, the light trap comprising:

a shaped body having at least three shape elements succeeding one another, said shaped body having a side facing the printing substrate and embodied to have said shape elements being step elements disposed in a stepped configuration, every one of said step elements having a pair formed of a step surface and a riser, said step surface and said riser having different inclinations relative to a direction of transport, said step surface has a step length L and said riser has a step height H, wherein the following applies: L>2H.

2. The light trap according to claim 1, wherein said shaped body is disposed to be positioned opposite the printing substrate transported along the light trap in the direction of transport.

3. The light trap according to claim 1, wherein said step elements succeed one another in or against the direction of transport.

4. The light trap according to claim 3, wherein said step surface and said riser succeed one another in or against the direction of transport.

5. The light trap according to claim 3, wherein:

a) said step surface is inclined in the direction of transport and said riser is inclined against the direction of transport; or b) said step surface is inclined against the direction of transport and said riser is inclined in the direction of transport.

6. The light trap recited in claim 5, wherein said step surface is inclined a) by less than 90° or b) by more than 90° relative to the direction of transport.

7. The light trap recited in claim 5, wherein said riser is inclined a) by more than 90° or b) by less than 90° relative to the direction of transport.

8. A printing machine for printing on a printing substrate using an ultraviolet-curable fluid, the printing machine comprising:

a printing head for transferring drops of fluid to the printing substrate;

an ultraviolet (UV) emitter for curing the fluid on the printing substrate using UV light; and at least one first light trap for the UV light disposed between said printing head and said UV emitter on a first side of the printing substrate and/or at least one second light trap for the UV light disposed on a second side of the printing substrate, wherein said at least one first and second light traps each contain:

a shaped body having at least three shape elements succeeding one another, said shaped body having a side facing the printing substrate and embodied to have said shape elements being step elements disposed in a stepped configuration, every one of said step elements having a pair formed of a step surface and a riser, said step surface and said riser having different inclinations relative to a direction of transport, said step surface has a step length L and said riser has a step height H, wherein the following applies: L>2H.

9. The printing machine according to claim 8, wherein said at least one first and second light traps are disposed at a distance of between 0.4 mm and 0.9 mm from the printing substrate.

* * * * *